US012791103B2

(12) United States Patent

Weber et al.

(10) Patent No.: US 12,791,103 B2
(45) Date of Patent: Nov. 10, 2026

(54) CONNECTING FLANGE FOR A CONTROL VALVE FOR REDUCING TORSION, AS WELL AS CONTROL VALVE AND METHOD FOR REDUCING TORSION

(71) Applicant: Samson Aktiengesellschaft, Frankfurt am Main (DE)

(72) Inventors: Sabine Weber, Frankfurt (DE); Johannes Jantz, Schmitten (DE); Andreas Reinthaler, Wiesbaden (DE); Daniel Gränz, Eschborn (DE)

(73) Assignee: Samson Aktiengesellschaft, Frankfurt am Main (DE)

( * ) Notice: Subject to any disclaimer, the term of this patent is extended or adjusted under 35 U.S.C. 154(b) by 3 days.

(21) Appl. No.: 18/973,944

(22) Filed: Dec. 9, 2024

(65) Prior Publication Data

US 2025/0189042 A1 Jun. 12, 2025

(30) Foreign Application Priority Data

Dec. 11, 2023 (DE) ......................... 202023107315.8

(51) Int. Cl.

*F16K 1/50* (2006.01)
*F16K 1/02* (2006.01)
*F16K 1/48* (2006.01)
*F16K 27/08* (2006.01)

(52) U.S. Cl.

CPC .................. *F16K 1/50* (2013.01); *F16K 1/02* (2013.01); *F16K 1/48* (2013.01); *F16K 1/485* (2013.01); *F16K 27/08* (2013.01)

(58) Field of Classification Search

None

See application file for complete search history.

(56) References Cited

U.S. PATENT DOCUMENTS 4,166,607 A * 9/1979 Webb ........................ F16K 1/10
251/273

FOREIGN PATENT DOCUMENTS

| | | | | |
|---|---|---|---|---|
| CN | 103939625 A * | 7/2014 | ............... | F16K 1/38 |
| CN | 105952915 A * | 9/2016 | ............ | F16K 41/10 |
| DE | 102016204440 A1 | 9/2017 | | |
| DE | 102018213711 A1 | 2/2020 | | |
| DE | 102018213712 A1 | 2/2020 | | |
| EP | 0959283 A1 | 11/1999 | | |
| EP | 2809979 B1 | 7/2020 | | |

OTHER PUBLICATIONS

Jun. 25, 2024 (DE) Search Report—App. 202023107315.8.

* cited by examiner

*Primary Examiner* — Atif H Chaudry
(74) *Attorney, Agent, or Firm* — Banner & Witcoff, Ltd.

(57) ABSTRACT

Aspects of the disclosure are directed to a connecting flange for a control valve for reducing torsion. The control valve may be adapted for adjusting a process fluid flow of a process plant, and may include a substantially hollow-cylinder-like connecting body for connecting a control rod of the control valve to a coupling structure attachable to a valve housing of the control valve or a housing cover of the control valve. The substantially hollow-cylinder-like connecting body may have an anti-rotation means which is configured to fix the connecting flange to the coupling structure or the housing cover in the circumferential direction, such as in a rotation-preventing manner.

17 Claims, 4 Drawing Sheets

CONNECTING FLANGE FOR A CONTROL VALVE FOR REDUCING TORSION, AS WELL AS CONTROL VALVE AND METHOD FOR REDUCING TORSION

CROSS REFERENCE TO RELATED APPLICATIONS

This patent application claims priority to German Patent Application No. 20 2023 107 315.8, filed Dec. 11, 2023, which is incorporated herein by reference in its entirety.

BACKGROUND

Field

The present disclosure relates to a connecting flange for a control valve for reducing torsion, wherein the control valve is adapted to adjust a process fluid flow of a process plant, such as a chemical plant, a power plant, a food processing plant, or the like. The disclosure also relates to a corresponding control valve and a method for reducing torsion.

Related Art

Document EP 0 959 283 A1 describes a valve with a spindle that can be moved axially via a handwheel and a nut part, with which the valve can be opened and closed. The valve has a housing in which a valve closure body is arranged, with which the valve can be shut off. This valve closure body with throttle function can be actuated via a spindle which is operatively connected to a nut part that can be rotated via a handwheel. This moves the spindle axially. The nut part is rotatably mounted in a bushing, which is part of a retaining bracket that is firmly connected to the housing. A lubrication nipple is screwed into the bushing, which leads into an annular groove provided in the nut part. A lubrication hole extends from this annular groove to the threaded part of the threaded spindle. The threaded shaft of the lubrication nipple is longer than the thickness of the wall of the bushing. If the lubrication nipple is screwed in completely, it protrudes into the annular groove and clamps the nut part. This locks the handwheel so that unintentional adjustment of the spindle is not possible.

Document EP 2 809 979 B1 describes an anti-rotation arrangement for use with fluid valves. The anti-rotation arrangement comprises an anti-rotation holder for coupling with a flow control element of a valve and an anti-rotator for engaging with the anti-rotation holder. The anti-rotation arrangement is arranged on the control element side of the control rod and is located inside the valve housing.

There is a need to provide an improved connecting flange that can facilitate the assembly of the control valve or its components and/or reduce any torsion or twisting that occurs, for example of the connecting flange itself and/or the control rod.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
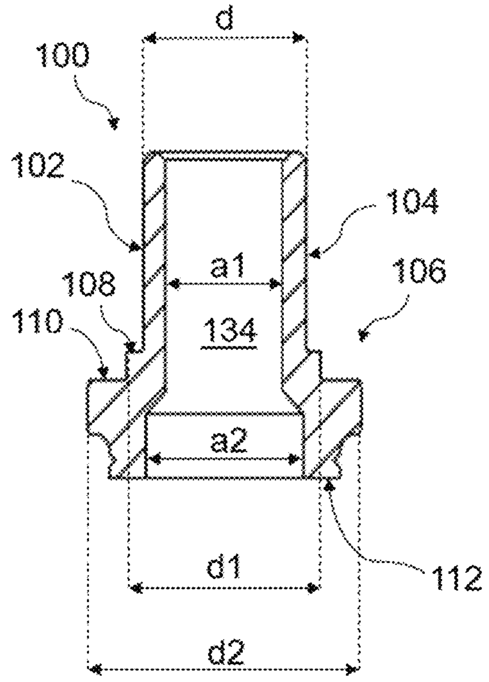
FIG. 1 shows a connecting flange according to the disclosure.

The exemplary embodiments of the present disclosure will be described with reference to the accompanying drawings. Elements, features and components that are identical, functionally identical and have the same effect are-insofar as is not stated otherwise-respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The drawings are schematic drawings that are not to scale. Some elements in the drawings may have exaggerated dimensions to emphasize aspects of the present disclosure and/or for better presentation clarity. For simplicity, identical reference signs are used to indicate identical elements, which are commonly included in the drawings. It is provided that elements and features of one embodiment may advantageously be incorporated into other embodiments without further mention. In general, only the differences with respect to individual embodiments are described.

Each embodiment is designed to explain the disclosure and is not intended to be limiting of the disclosure. In addition, features shown or described as part of one embodiment may be used in conjunction with other embodiments to create another embodiment. It is intended that the description include such modifications and variations.

It is an object of the present disclosure to overcome the disadvantages of the conventional techniques and, in particular, to provide an improved control rod arrangement and valve extension, as well as an improved control valve and a corresponding method for its assembly.

The disclosure relates to a connecting flange for a control valve for reducing torsion, wherein the control valve is adapted to adjust a process fluid flow of a process plant, such as a chemical plant, a power plant, a food processing plant or the like, comprising:

a substantially hollow-cylinder-like connecting body for connecting a control rod of the control valve to a coupling structure, in particular a lantern, attachable to a valve housing of the control valve or a housing cover of the control valve, characterized in that the substantially hollow-cylinder-like connecting body has at least one, in particular outer-side, anti-rotation means, which is configured to fix the connecting flange, in particular during its assembly, to the coupling structure, in particular the lantern, or the housing cover, in particular in a form-fitting and/or form-complementary manner, in the circumferential direction, in particular in a rotation-preventing fixing manner.

The disclosure relates to a connecting flange, in particular according to one or more of the aspects and/or embodiments of the disclosure described herein, for a control valve for reducing torsion, wherein the control valve is adapted to adjust a process fluid flow of a process plant, such as a chemical plant, a power plant, a food processing plant or the like, comprising:

a substantially hollow-cylinder-like connecting body for connecting a control rod of the control valve to a coupling structure, in particular a lantern, attachable to a valve housing of the control valve or a housing cover of the control valve, characterized in that the substantially hollow-cylinder-like connecting body has at least one, in particular outer-side, anti-rotation means, wherein the at least one, in particular outer-side, anti-rotation means is formed by an outer shape of the substantially hollow-cylinder-like connecting body, wherein the outer shape has a cross-section which deviates from a substantially circular cross-section.

The disclosure relates to a connecting flange, in particular according to one or more of the aspects and/or embodiments of the disclosure described herein, for a control valve for reducing torsion, wherein the control valve is adapted to adjust a process fluid flow of a process plant, such as a chemical plant, a power plant, a food processing plant or the like, comprising:

a substantially hollow-cylinder-like connecting body for connecting a control rod of the control valve to a coupling structure, in particular a lantern, attachable to a valve housing of the control valve or a housing cover of the control valve, characterized in that the substantially hollow-cylinder-like connecting body has at least one, in particular inner-side, anti-rotation means which is configured to fix the control rod to the connecting flange, in particular in a form-fit and/or form-complementary manner, in the circumferential direction, in particular to prevent rotation of the control rod, in particular during operation of the control valve.

The disclosure relates to a connecting flange, in particular according to one or more of the aspects and/or embodiments of the disclosure described herein, for a control valve for reducing torsion, wherein the control valve is adapted to adjust a process fluid flow of a process plant, such as a chemical plant, a power plant, a food processing plant or the like, comprising:

a substantially hollow-cylinder-like connecting body for connecting a control rod to a coupling structure, in particular a lantern, attachable to a valve housing of the control valve or a housing cover of the control valve, characterized in that the substantially hollow-cylinder-like connecting body has at least one, in particular outer-side, anti-rotation means which is formed according to the at least one, in particular outer-side, anti-rotation means of the connecting flange according to one or more of the aspects and/or embodiments of the disclosure described herein, and at least one anti-rotation means, in particular inner-side, which is formed according to the at least one, in particular inner-side, anti-rotation means of the connecting flange according to one or more of the aspects of the disclosure and/or embodiments described herein.

The disclosure relates to a control rod for a control valve for adjusting a process fluid flow of a process plant, such as a chemical plant, a power plant, a food processing plant, or the like, wherein the control rod has at least one recess, in particular a groove, extending longitudinally in particular in the axial direction of the control rod, for, in particular rotation-preventing, fixing of the control rod in the circumferential direction on a connecting flange according to one or more of the aspects and/or embodiments of the disclosure described herein, in particular by means of a control rod securing element, in particular a pin, in particular a dowel pin.

The disclosure relates to a housing cover for a control valve for adjusting a process fluid flow of a process plant, such as a chemical plant, a power plant, a food processing plant, or the like, wherein the housing cover may comprise a through-opening for a control rod, in particular according to one or more of the aspects and/or embodiments of the disclosure described herein, characterized in that the housing cover has a connecting flange receptacle which has a shape, in particular an inner shape, with a cross-section which deviates from a substantially circular cross-section, in particular for receiving and/or rotation-preventing fixing of a connecting flange according to one or more of the aspects and/or embodiments of the disclosure described herein.

The disclosure relates to a coupling structure, in particular a lantern, for a control valve for adjusting a process fluid flow of a process plant, such as a chemical plant, a power plant, a food processing plant, or the like, wherein the coupling structure may comprise a through-opening for a control rod, in particular according to one or more of the aspects of the disclosure and/or embodiments described herein, characterized in that the coupling structure, in particular the lantern, has a connecting flange receptacle which has a shape, in particular an inner shape, with a cross-section which deviates from a substantially circular cross-section, in particular for receiving and/or rotation-preventing fixing of a connecting flange according to one or more of the aspects and/or embodiments of the disclosure described herein.

The disclosure relates to a control valve for adjusting a process fluid flow of a process plant, such as a chemical plant, a power plant, a food processing plant, or the like, wherein the control valve may comprise:

- a valve housing with an inlet opening and an outlet opening, as well as a passage opening arranged between them;
- a housing cover arranged opposite the passage opening, in particular according to one or more of the aspects and/or embodiments of the disclosure described herein, with a through-opening for a control rod, in particular according to one or more of the aspects and/or embodiments of the disclosure described herein; and
- a connecting flange according to one or more of the aspects and/or embodiments of the disclosure described herein.

The disclosure relates to a method for reducing torsion with

- a connecting flange according to one or more of the aspects and/or embodiments of the disclosure described herein,
- of a control rod according to one or more of the aspects and/or embodiments of the disclosure described herein,
- a coupling structure, in particular a lantern, in particular according to one or more of the aspects of the disclosure and/or embodiments described herein,
- a housing cover, in particular according to one or more of the aspects of the disclosure and/or embodiments described herein, and/or
- a control valve in particular according to one or more of the aspects and/or embodiments of the disclosure described herein.

In an exemplary embodiment, in a method step, the control rod is connected to a valve member, for example a piston or the like and arranged via this in the valve housing at a throttle point. In an exemplary embodiment, in a method step, in particular after connecting and arranging the control rod with the valve member, the bellows is attached to the control rod with the connecting flange. In an exemplary embodiment, in a method step, in particular after connecting and arranging the control rod with the valve member and/or after fastening the bellows, an insert, in particular for guiding the control rod in or on the housing, is slid over the control rod and the bellows and arranged in the valve housing. In an exemplary embodiment, in a method step, in particular after connecting and arranging the control rod to the valve member, after fastening the bellows and/or after arranging the insert, at least one or more sealing means for sealing between the valve housing and the coupling structure are arranged on the valve housing. In an exemplary embodiment, in a method step, in particular after connecting and arranging the control rod to the valve member, after attaching the bellows, after arranging the insert part and/or after arranging the seal(s), the coupling structure, in particular the base body of the coupling structure, is arranged on the valve housing and, in particular, attached. In an exemplary embodiment, in a method step, in particular after connecting and arranging the control rod to the valve member, after fastening the bellows, after arranging the insert part, after arranging the seal(s) and/or after arranging/fastening the coupling structure, in particular the base body of the coupling structure, the at least one sealing means is applied to the base body, in particular in the receiving recess, in particular the second portion of the receiving recess. In an exemplary embodiment, in a method step, in particular after connecting and arranging the control rod to the valve member, after fastening the bellows, after arranging the insert part, after arranging the seal(s), after arranging/fastening the coupling structure, in particular the base body of the coupling structure, and/or after applying the at least one sealing means, the receiving part may be slipped over the control rod and placed against the base body, so that the outer contour in the receiving recess lies against the base body, in particular the inner wall, wherein the connecting flange may be held against the receiving part in an anti-rotatable manner via the connecting flange receptacle and/or wherein, in particular simultaneously, the receiving part may be arranged against the base body in an anti-rotatable manner. In an exemplary embodiment, the at least one sealing means may be clamped or pressed between the base body and the receiving part when the receiving part may be arranged on the base body. In an exemplary embodiment, in a method step, in particular after connecting and arranging the control rod to the valve member, after fastening the bellows, after arranging the insert part, after arranging the seal(s), after arranging/fastening the coupling structure, in particular the base body of the coupling structure, after applying the at least one sealing means and/or after arranging the receiving part on the base body, the fastening means may be connected to the connecting flange, in particular attached to the connecting flange, wherein the receiving part may be clamped. In an exemplary embodiment, in a method step, in particular after connecting and arranging the control rod to the valve member, after fastening the bellows, after arranging the insert part, after arranging the seal(s), after arranging/fastening the coupling structure, in particular the base body of the coupling structure, after arranging the at least one sealing means, after arranging the receiving part on the base body and/or after fastening the fastening means, the housing cover may be arranged and attached to the coupling structure, in particular to the base body of the coupling structure.

The disclosure relates to a use of a connecting flange according to one or more of the aspects and/or embodiments of the disclosure described herein, a housing cover according to one or more of the aspects and/or embodiments of the disclosure described herein, a coupling structure, in particular a lantern according to one or more of the aspects and/or embodiments of the disclosure described herein, a control valve according to one or more of the aspects and/or embodiments of the disclosure described herein, and/or a method according to one or more of the aspects and/or embodiments of the disclosure described herein, for fixing the position of a control valve according to one or more of the aspects and/or embodiments of the disclosure described herein, a control valve according to one or more of the aspects of the disclosure and/or embodiments described herein, and/or a method according to one or more of the aspects of the disclosure and/or embodiments described herein, for fixing the position and/or preventing rotation, in particular during assembly of the control valve and/or for preventing rotation of the control rod, in particular during operation of the control valve.

Aspects of the disclosure and/or embodiments described herein may be suitable, formed, adapted and/or configured for a control valve. The control valve may be adapted for adjusting a process fluid flow of a process plant, such as a chemical plant, a power plant, a food processing plant or the like.

The components of a control valve or a control valve according to the disclosure are briefly described below. When reference is made to a housing cover, a coupling structure or lantern, a control rod and/or a connecting flange, it should be understood that this may refer to the housing cover according to the disclosure, the coupling structure or lantern according to the disclosure, the control rod according to the disclosure and/or the connecting flange according to the disclosure. It should also be made clear that the embodiments relating to the coupling structure or lantern according to the disclosure can apply equally to the housing cover according to the disclosure and vice versa. This is due, for example, to the fact that the use of the coupling structure or the lantern is optional, i.e. the connecting flange according to the disclosure can be used equally in the housing cover, for example instead of the coupling structure. Of course, this also applies vice versa.

The control valve, or the control valve according to the disclosure described herein, may comprise a valve housing and a housing cover, for example a housing cover according to the disclosure described herein. The valve housing may comprise an inlet opening and an outlet opening and a passage opening arranged therebetween. The control valve may also comprise a valve seat which may surround the passage opening. The valve seat can be fully circular. Furthermore, the control valve may comprise a control element which may be movable in the valve housing and which may be attached to a control rod, for example a control rod according to the disclosure described herein. The control element can be brought into scaling engagement with the valve seat. The valve seat and the control element can be matching for sealing engagement. The housing cover can have a through-opening for the control rod. The housing cover can be arranged opposite the passage opening. The housing cover can be attached or attachable to the valve housing. The control valve can comprise a control element that may be translationally movable along a stroke axis, such as a globe valve element, for example a valve piston or valve plug. The control element may be adapted to adjust a process fluid flow in a process plant. Exemplary control elements can include a piston for a cage valve, a V-port plug or the like.

The valve housing, which can also be referred to as the housing body, can have a process fluid inlet, a process fluid outlet and a process fluid passage arranged between the process fluid inlet and the process fluid outlet. Furthermore, the housing body may comprise an actuating opening for inserting the control element and/or a control rod for actuating the control element along the stroke axis. At the process fluid inlet and at the process fluid outlet of the valve body, mounting devices, for example flange-like fastening sections, can be provided for connecting a pipeline for guiding the process fluid. A valve seat can be provided on the process fluid passage of the valve housing, which can cooperate with the control element in a closing and/or opening manner. The valve seat can be an annular and/or sleeve-shaped seat of an insertable component. The valve seat can have one or more sealing surfaces for sealing cooperation with the control element, in particular a valve piston or valve cone. One (or more) sealing devices, such as a ring seal, can be arranged between the valve seat and the valve housing.

The valve housing can be a particularly one-piece body made of one or more media- and/or temperature-resistant materials. For example, the valve housing can be a one-piece cast metal body or forged body which may be sectionally coated with a machined, for example polished and/or coated, for example painted, powder-coated, chrome-plated, enameled, galvanized or similar, surface. It may be preferred that the valve housing defines an internal housing space, the openings of which may be realized exclusively by the process fluid inlet, the process fluid outlet and the actuation opening. It is conceivable that a housing body has further openings to the inner space, for example openings for the introduction of sensors or one or more further process fluid inlets or outlets.

The housing cover may be arranged and adapted to cover the actuating opening. The housing cover can have a through-opening extending in the direction of the stroke axis for receiving the control rod. In particular, the housing cover can comprise a fastening section for mounting an actuator, in particular a pneumatic actuator, or a yoke, a coupling structure, in particular a lantern or the like for supporting an actuator. A corresponding fastening section can also be provided on the valve housing.

The through-opening can be free of sealing means for sealing between the housing cover and the control rod or the pre-mountable control rod assembly. The through-opening can be free of guides, such as a plain bearing, a ball bearing or the like, for translationally guiding the control element. With regard to a control rod, the housing cover can be dimensioned in such a way that the smallest clear width, in particular the smallest inner diameter, of the housing cover, in particular the through-opening, may be at least 1 mm or at least 5 mm larger as the outer diameter of the control rod in the region that extends through-opening of the housing cover. The housing cover can be formed from a temperature- and/or media-resistant material. It is conceivable that the same material is selected for the valve housing and the housing cover. The housing cover and the valve housing can be designed for mounting the housing cover in direct contact with the housing body. For example, the housing body and the housing cover can have corresponding flange sections for attaching the housing cover to the housing body. A coupling structure, in particular a lantern, can also be provided between them, but this is not mandatory. The housing cover can have a plate-like cover section, which can be designed to completely close the actuating opening of the valve housing in the radial direction and in the circumferential direction with respect to the stroke axis, with the exception of the through-opening.

The control valves of the process plant can be embodiments according to the disclosure in various ways, i.e. the control valves need not be identical. In particular, the process plant can comprise a plurality of control valves according to the disclosure with similar valve housings, housing covers, mounting flanges, coupling structures, in particular lanterns (if present), and/or different types of insert sleeves and/or control elements. The system can also comprise a set of process control valves for one or more process plants, which has a plurality of similar valve housings, a plurality of similar housing covers, a plurality of similar coupling structures, in particular lanterns (if present), and/or a plurality of similar mounting flanges, and/or a plurality of different insert sleeves and/or a plurality of different control elements.

The process plant with several control valves can comprise at least two different, in particular similar, mounting flanges and/or two different insert sleeves and/or two different control elements, wherein the insert sleeves of the several control valves can be inserted alternately into the different mounting flanges.

A "connecting flange" can be understood herein as an apparatus, assembly, part, component, element and/or device which can create, provide and/or produce an, in particular mechanical, interface and/or connection between different, for example two, (structural) parts or components, for example a control rod, a housing cover and/or a coupling structure, in particular a lantern. The connecting flange can thus be adapted and/or formed for connecting and/or attaching between the control rod and the housing cover and/or the coupling structure, in particular the lantern, wherein the connecting flange can be, for example, held, attached/attachable and/or fixed/fixable between the control rod and the housing cover and/or the coupling structure, in particular the lantern, in a form-fitting and/or force-fitting manner. The connecting flange can be compatible with a plurality of control rods, housing covers and/or lanterns, which increases flexibility and/or modularity.

The connecting flange can be arranged and/or adapted for engaging and/or connecting, in particular attaching, a control rod of the control valve to a coupling structure, in particular a lantern, or a housing cover of the control valve, which may be attachable in particular to a valve housing of the control valve. The connecting flange can have a substantially hollow-cylinder-like connecting body. “Substantially hollow-cylinder-like” herein may describe a structure and/or shape that may substantially represent a cylindrical object that is hollow on the inside, similar to a tube. However, the structure and/or shape may merely have similarities with a hollow cylinder, i.e. there may be certain deviations and/or modifications from the exact cylinder shape, e.g. with regard to the inner/outer shape and/or its diameter. The connecting flange and/or the substantially hollow-cylinder-like connecting body may have a through-opening that extends, for example, in its longitudinal direction and/or in the direction of the stroke axis. The inner diameter of the through-opening can be at least sectionally matched and/or adapted to the outer diameter of the control rod, in particular shape-matched and/or shape-adapted, for example to provide a guide for the control rod, e.g. during a stroke movement. The through-opening can have a substantially constant cross-section and/or diameter. However, the cross-section and/or diameter a1 can also change, e.g. in the longitudinal direction, e.g. enlarge and/or widen, e.g. abruptly and/or in a stepped manner, e.g. to a diameter a2, wherein a1<a2 may apply. The, in particular on the inner-side, change in cross-section and/or diameter of the connecting flange can be matched and/or adapted to the, in particular outer-side, change in cross-section and/or diameter of the control rod for example for form-fit and/or form-complementary engagement.

The connecting flange, in particular the substantially hollow-cylinder-like connecting body, can have an outer shape which may be adapted for engagement and/or attachment with the coupling structure, in particular the lantern, or the housing cover of the control valve. For example, the substantially hollow-cylinder-like connecting body can have a section, in particular a fastening section, with a substantially constant outer diameter d, in particular in the longitudinal direction, which may be adapted for fastening to the coupling structure, in particular the lantern, or the housing cover of the control valve. The fastening section can, for example, have a threaded section, in particular on the outside, for example for screwing to a fastening means, such as a union nut or similar. The fastening section can be followed by a further section, in particular an engagement section, which can have a larger outer diameter than the outer diameter d of the fastening section. The fastening section and the engagement section can be formed in one piece, in particular by the substantially hollow-cylinder-like connecting body, for example from the same material, such as CrNi steels, Inconel, Hastelloy, etc. The engagement section can have an outer contour that may be formed step-wise, for example the engagement section can have one or more steps that have one or more, in particular different, diameters, in particular outer diameters.

The connecting flange, in particular the engagement section, can have, in particular on the outside, at least one first shoulder, in particular a first radial shoulder. The radial shoulder can be designed and/or adapted for engagement, in particular form-fit and/or form-complementary engagement, with the coupling structure, in particular the lantern, or the housing cover of the control valve. The first shoulder can be a circumferential shoulder that extends substantially around the entire circumference of the connecting flange. The diameter, in particular the outer diameter, d1 of the first shoulder can be larger than the diameter, in particular the outer diameter d, of the substantially hollow-cylinder-like connecting body, in particular the fastening section, wherein d1>d may apply.

The connecting flange, in particular the engagement section, can have, in particular on the outside, at least one second shoulder, in particular a second radial shoulder, for the reception of at least one sealing means. The at least one sealing means can, for example, be arranged or arrangeable on the shoulder, e.g. the second shoulder. By means of the at least one scaling means, for example, a seal or sealing between the connecting flange and a coupling structure, in particular a lantern, or a housing cover can be provided, in order to prevent a process medium from escaping to the outside, for example into the atmosphere. The at least one sealing means may be referred to as a first sealing means. The radial shoulder may be a circumferential shoulder extending substantially around the entire circumference of the connecting flange. The first shoulder may connect to the second shoulder, in particular in a stepped manner. The diameter, in particular the outer diameter, d2 of the second shoulder may be larger than the diameter, in particular the outer diameter d, of the substantially hollow-cylinder-like connecting body, in particular the fastening section, wherein d2>d may apply, and/or may be larger than the outer diameter d1 of the first shoulder, wherein d2>d1 may apply and in particular d2>d1>d. A different choice of these outer diameters d, d1, d2 is also conceivable. For example, the inner diameter a1 of the connecting flange can be adapted and/or matched to the outer diameter D1 and/or the inner diameter a2 of the connecting flange can be adapted and/or matched to the outer diameter D2. The at least one sealing means can, for example, be a sealing means in the form of a ring seal, which may be produced from graphite, for example. It is also possible for a sealing means to be used that is produced from a metal, for example for metallic sealing or sealing.

The connecting flange can, in particular in its longitudinal direction, have a face side, e.g. an end face side, which may be arranged and/or adapted for the arrangement and/or attachment of at least one, e.g. further, in particular second, sealing means. The further sealing means may, for example, be a bellows seal.

The connecting flange described herein can be formed in one piece and/or produced in layers, for example by means of 3D printing.

In a first embodiment example, a connecting flange may be provided for a control valve to reduce torsion.

“Torsion” can be understood to mean, for example, undesired, unwanted and/or unintentional movements and/or forces, for example, in the circumferential direction and/or radial direction, rotational movements and/or torsions, which i) can occur, for example, when mounting, fastening, screwing in and/or fixing the connecting flange and/or ii) for example during operation, for example, of the control valve or during a movement, for example, a stroke movement of the control rod, in particular in the case of, for example, asymmetrical process flows that can act on the control element. Such torsions can have a negative effect not only on the assembly of the connecting flange, but also on the operation of the control valve, for example the control rod therein.

When assembling the connecting flange, it may be desirable, for example, that a force and/or a movement, in particular an assembly movement, e.g. tensioning, acts substantially predominantly or exclusively in the axial direction (e.g. of the connecting flange and/or the control rod), since movements and/or forces, e.g. in the radial direction and/or in the circumferential direction, have a negative effect on one or more sealing means and can, for example, damage them. For example, the first sealing means, in particular the ring seal, and/or the second sealing means, in particular the bellows seal, can be damaged, wherein the connecting flange may be formed and/or adapted, among other things, to protect these sealing means. If a force and/or movement component in the radial direction and/or in the circumferential direction becomes too large (or is at least present to a certain extent), one or more sealing means, for example the first and/or second sealing means, can deform at least in certain areas or substantially completely and/or can even be separated.

Process flows, in particular asymmetrical process flows, e.g. flows of fluids that have different/uneven velocities, volumes and/or pressures. If such process flows act on the control element, this can lead to torsions, e.g. of the control element, which can be transmitted directly via the control rod or have an effect on it. Such torsion can have an equally negative effect on the functioning of the control valve as such and, for example, the bellows seal.

By "reducing" or "reduction" it can be meant that the torsions described herein are prevented, avoided, minimized, diminished, weakened and/or reduced or that such torsions are counteracted.

The connecting flange according to the disclosure can have a substantially hollow-cylinder-like connecting body for connecting a control rod of the control valve to a coupling structure, in particular a lantern, attachable to a valve housing of the control valve or a housing cover of the control valve.

The substantially hollow-cylinder-like connecting body can have at least one, in particular outer-side, anti-rotation means. The at least one, in particular outer-side, anti-rotation means, can be configured and/or adapted to fix the connecting flange, in particular during its assembly, to the coupling structure, in particular the lantern, or the housing cover, in particular in a form-fit and/or form-complementary manner, in the circumferential direction, in particular in a rotation-preventing manner.

An "anti-rotation means" may be understood to be an apparatus, mechanism, element and/or structure capable of reducing torsions described herein and/or fixing and/or maintaining a position, alignment and/or orientation of, for example, the connecting flange and/or the control rod, in particular in the radial and/or circumferential direction. "Rotation-preventing" can therefore be understood to mean that a force, e.g. during assembly, acts, e.g. predominantly or almost exclusively, in the axial direction, while a force in the circumferential direction and/or radial direction may be substantially suppressed, avoided and/or at least, in particular partially, minimized, whereby forces are also exerted on one or more sealing means, for example on a first sealing means, e.g. a ring seal, and/or on a second sealing means, e.g. a bellows seal attachable and/or attachable to the connecting flange, are substantially suppressed, avoided and/or at least, in particular partially, minimized. Such forces can be avoided and/or at least, in particular partially, minimized, in particular in comparison, if the anti-rotation means were not present on the connecting flange.

An anti-rotation means described herein may be or act a) "on the outer-side", for example providing a securing, fixing and/or stabilization in the direction of an outer side of the connecting flange, for example in the direction of the coupling structure, in particular the lantern and/or the housing cover. Here, for example, the anti-rotation means can be located on an outer side, in particular on a circumference or a peripheral side, of the substantially hollow-cylinder-like connecting body (and/or a fastening section).

An anti-rotation means described herein may be or act b) "on the inner-side", for example providing a securing, fixing and/or stabilization in the direction of an inner side of the connecting flange, for example in the direction of the control rod of the control valve. Here, for example, the anti-rotation means can be located on an inner side of the through-opening of the substantially hollow-cylinder-like connecting body (and/or the fastening section) and/or extend through it, in particular substantially completely.

An anti-rotation means described herein can also be a combination of a) and b), e.g. configured and/or adapted as an outer-side and inner-side anti-rotation means.

The at least one, in particular outer-side, anti-rotation means can be formed as at least one recess or cutout, in particular as at least one notch. The recess can be located on an outer side, in particular on a circumference or a circumferential side, of the substantially hollow-cylinder-like connecting body (and/or a fastening section). The recess can be formed for engagement (e.g. form-fit and/or form-complementary, e.g. latching, snapping, locking and/or interlocking) with a connecting flange securing element, in particular a pin, in particular a dowel pin, in particular to prevent rotation. The connecting flange securing element can secure and/or hold or fix the connecting flange in the circumferential direction, in particular during its assembly. The recess can be formed in different ways, for example as a notch, in particular an elongated notch, which extends in the axial direction of the connecting flange. A shaping of the recess as a, in particular elongated, notch can have the advantage that the recess may be adapted for several, in particular axial, positions or heights of the connecting flange securing element, which increases flexibility. The recess can also be formed as a, in particular substantially circular, blind hole. A depth or height of the recess can be smaller than a thickness, in particular a wall thickness, of the substantially hollow-cylinder-like connecting body. Alternatively, it would also be conceivable for the recess to substantially completely penetrate the substantially hollow-cylinder-like connecting body, e.g. in the radial direction of the substantially hollow-cylinder-like connecting body.

In a second embodiment example, which can in particular be combined with one or more of the aspects of the disclosure and/or embodiment examples described herein, a connecting flange for a control valve for reducing torsion is provided.

The connecting flange according to the disclosure can have a substantially hollow-cylinder-like connecting body for connecting a control rod of the control valve to a coupling structure, in particular a lantern, attachable to a valve housing of the control valve or a housing cover of the control valve.

The substantially hollow-cylinder-like connecting body can have at least one, in particular outer-side, anti-rotation means. The at least one, in particular outer-side, anti-rotation means can be formed and/or defined by an outer shape of the substantially hollow-cylinder-like connecting body. For example, the outer shape may have a cross-section that deviates from a substantially circular cross-section. With such an arrangement, the connecting flange and/or the substantially hollow-cylinder-like connecting body can counteract a force, e.g. in the circumferential direction during fastening, in particular during assembly. This reduces, for example, unwanted torsion and a tensioning can take place substantially predominantly or almost exclusively in the axial direction.

The outer shape of the substantially hollow-cylinder-like connecting body and/or the at least one anti-rotation means can have a substantially (at least partially and/or sectionally) rectangular, oval, elliptical, trapezoidal, star-shaped, polygonal, irregular and/or asymmetrical cross-section. The outer shape of the substantially hollow-cylinder-like connecting body and/or the at least one anti-rotation means may, for example, have at least one corner and/or at least one corner point.

A "corner" or "corner point" may be understood to mean that at least two lines, (outer) edges or faces meet forming an angle therebetween. However, these terms should not be understood herein in a limiting sense to mean that the corners or corner points have a substantially straight, sharp-edged and/or right-angled (e.g. 90°) configuration, or a course. Rather, round, curved, swung, inclined, slanted and/or oblique corners or corner points can also be included, or, for example, two lines, (outer) edges or faces that come together at an angle of less than 90° and thus form a corner or a corner point. The at least one anti-rotation means can, for example, be formed at least as a single corner, e.g. as a spherical corner, which can substantially resemble a drop shape. For example, a circular shape could be interrupted at e.g. two points and continued at these points, e.g. in the form of substantially straight lines or (outer) edges, in particular without kinks. These two lines or (outer) edges can meet at a point, e.g. a corner point, and thus form a corner.

The outer shape of the substantially hollow-cylinder-like connecting body and/or the at least one anti-rotation means can have a plurality of corners and/or a plurality of corner points, wherein in particular the at least one anti-rotation means can be formed as a polygon. The corners can be formed differently, e.g. in terms of their shape, angle and/or size, or substantially identical. The corners may be evenly distributed, e.g. along the circumferential direction of the substantially hollow-cylinder-like connecting body and/or the at least one anti-rotation means, e.g. at equal distances and/or angles or angular segments, or unevenly distributed, e.g. at different and/or varying distances, angles and/or asymmetrically, e.g. rotationally asymmetrically. The corners may also have a shape that interlocks with or engages in the substantially hollow-cylinder-like connecting body.

The outer shape of the at least one anti-rotation means may be matched to a shape, in particular an inner shape, of a connecting flange receptacle of the coupling structure, in particular the lantern, or of the housing cover, in particular for form-fit and/or form-complementary engagement therewith.

In a third embodiment example, which can be combined in particular with one or more of the aspects of the disclosure and/or embodiment examples described herein, a connecting flange for a control valve for reducing torsion is provided.

The connecting flange according to the disclosure can have a substantially hollow-cylinder-like connecting body for connecting a control rod of the control valve to a coupling structure, in particular a lantern, attachable to a valve housing of the control valve or a housing cover of the control valve.

The substantially hollow-cylinder-like connecting body can have at least one, in particular inner-side, anti-rotation means. The at least one, in particular inner-side, anti-rotation means can be configured to fix the control rod to the connecting flange, in particular in a form-fit and/or form-complementary manner, in the circumferential direction, in particular to prevent rotation of the control rod, in particular during operation of the control valve. For example, a rotation-preventing engagement (e.g. engaging, snapping, locking and/or latching) can be provided, for example, by a control rod securing element, in particular a pin, in particular a dowel pin.

The at least one, in particular inner-side, anti-rotation means can be formed as at least one first opening, in particular a first through-hole. The at least one first opening can be adapted or formed for, in particular form-fit and/or form-complementary, arrangement and/or reception of the control rod securing element, in particular a pin, in particular a dowel pin. The at least one first opening can extend, in particular in the radial direction of the connecting flange, through the substantially hollow-cylinder-like connecting body, in particular through a thickness, in particular a wall thickness, of the substantially hollow-cylinder-like connecting body, in particular substantially completely, or only partially, e.g. formed as a blind hole.

The at least one first opening can enable the control rod securing element to reach a recess, in particular a groove, extending longitudinally in particular in the axial direction of the control rod, in order to engage therewith, in particular in a form-fit and/or form-complementary manner, to latch, snap in or to interlock and/or lock it, in particular in the circumferential direction of the control rod.

The connecting flange and/or the at least one, in particular inner-side, anti-rotation means can comprise at least one second opening, in particular a second through-hole. The second opening can generally be substantially identical to the first opening or have a different design, e.g. a different opening diameter. The second opening can be adapted or formed for, form-fit and/or form-complementary, arrangement and/or reception of a second control rod securing element, in particular a pin, in particular a dowel pin. More than two openings are also conceivable, which can, for example, be arranged evenly, e.g. at equal distances, or unevenly, e.g. at different distances, in the circumferential direction of the connecting flange. A second anti-rotation means in the form of a second opening for a second control rod securing element can provide additional fixation and reduce torsions even further. The at least one first opening and/or the at least one second opening can be arranged approximately in the middle of the connecting flange, in particular when viewed in the axial direction, wherein the at least one first opening and the at least one second opening can be arranged opposite one another. This can, for example, distribute forces better or more evenly. A position or location of the at least one first opening and/or the at least one second opening on the connecting flange can be matched to a position of the recess, in particular the groove, which extends longitudinally, in particular in the axial direction of the control rod.

In a fourth embodiment example, which can be combined in particular with one or more of the aspects of the disclosure and/or embodiment examples described herein, a connecting flange for a control valve for reducing torsion is provided.

The connecting flange according to the disclosure can have a substantially hollow-cylinder-like connecting body for connecting a control rod of the control valve to a coupling structure, in particular a lantern, attachable to a valve housing of the control valve or a housing cover of the control valve.

The substantially hollow-cylinder-like connecting body can have

- at least one, in particular outer-side, anti-rotation means which may be formed
  - according to the at least one, in particular outer-side, anti-rotation means of the connecting flange according to one or more of the aspects and/or embodiments of the disclosure described herein, and
- at least one, in particular inner-side, anti-rotation means which if formed
  - according to the at least one, in particular inner-side, anti-rotation means of the connecting flange according to one or more of the aspects of the disclosure and/or embodiments described herein. This embodiment example can thus represent the already mentioned combination of a) and b) (see above).

The control rod according to the disclosure may have one or more recesses, in particular grooves, extending longitudinally in particular in the axial direction of the control rod, for, in particular rotation-preventing, fixing of the control rod in the circumferential direction on the connecting flange according to the disclosure. The recesses can be arranged evenly distributed in the circumferential direction of the control rod, e.g. at equal distances, angles or angular segments, or unevenly, e.g. at different and/or varying distances and/or asymmetrically, e.g. rotationally asymmetrically. The recesses can be substantially opposite each other. During a stroke movement of the control rod, one or more control rod securing elements can engage in the recesses, e.g. latch or snap in, and thus hold, guide, lock, secure and/or fix a position of the control rod, in particular in the circumferential direction, in particular when asymmetrical process fluid flows act on the control element and/or the control rod, for example during operation.

The housing cover according to the disclosure and/or the coupling structure according to the disclosure can have a connecting flange receptacle. In the following, the housing cover according to the disclosure is discussed by way of example. However, it should be made clear that the embodiments also apply equally to the coupling structure according to the disclosure, in particular the lantern. The connecting flange receptacle can be formed as an opening, in particular a through hole, for example a connecting flange receiving opening, at and/or in which the connecting flange according to the disclosure may be arrangeable, in particular insertable and/or attachable.

The substantially hollow-cylinder-like connecting body of the connecting flange according to the disclosure can protrude and/or stick out at least partially from the housing cover, in particular from the connecting flange receiving opening. The at least one first shoulder, in particular the first radial shoulder, of the connecting flange can, in particular on an inner-side, abut and/or engage, in particular in a form-fit and/or form-complementary manner, for example on one or more steps/shoulders of the connecting flange receiving opening. The substantially hollow-cylinder-like connecting body of the connecting flange, in particular its fastening section, can be attachable, in particular clampable, to the housing cover by means of a fastening means, in particular a union nut. For example, the connecting flange can be tensioned and/or clamped by screwing or tightening the union nut to the housing cover and/or in its connecting flange receiving opening.

The connecting flange receptacle may have a shape, in particular an inner shape, with a cross-section that deviates from a substantially circular cross-section, in particular for receiving and/or rotation-preventing fixing of a connecting flange according to one or more of the aspects of the disclosure and/or embodiments described herein. In other words, the outer shape of the at least one anti-rotation means and/or the hollow-cylinder-like connecting body can be matched to a shape, in particular an inner shape, of the connecting flange receptacle of the coupling structure, in particular the lantern, or of the housing cover, in particular for form-fit and/or form-complementary engagement therewith, for example for latching, snapping in, locking and/or interlocking. This can reduce any twisting and/or torsion that occurs.

A control valve according to the disclosure for adjusting a process fluid flow of a process plant, such as a chemical plant, a power plant, a food processing plant, or the like, may comprise: a valve housing having an inlet opening and an outlet opening, as well as a passage opening arranged therebetween; a housing cover arranged opposite the passage opening, in particular according to one or more of the aspects of the disclosure and/or embodiments described herein, having a passage opening for a control rod, e.g. a control rod according to the disclosure, in particular according to one or more of the aspects of the disclosure and/or embodiments described herein; and a connecting flange according to one or more of the aspects of the disclosure and/or embodiments described herein. For example, a control rod according to the disclosure, in particular according to one or more of the aspects of the disclosure and/or embodiments described herein; and a connecting flange according to one or more of the aspects of the disclosure and/or embodiments described herein. The control valve according to the disclosure can optionally comprise a coupling structure, in particular a lantern, in particular according to one or more of the aspects of the disclosure and/or embodiments described herein, which may be arranged, in particular attached, between the housing cover and the valve housing. The connecting flange may be arranged and/or attached to a section of the coupling structure on the housing cover side, in particular the lantern, in particular within the connecting flange receptacle. In an exemplary embodiment, a bellows seal can be attached or attachable to the control rod, wherein in particular the bellows seal can be connected at one point, in particular directly, materially connected, for example welded, to the control rod and at another point, in particular directly, materially connected, for example welded, to the connecting flange.

The bellows seal may comprise a fold-like structure consisting of one or more bellows which may in particular be strung together in a wave-like form, wherein the fold-like structure may be in particular arranged and adapted to expand and/or compress, in particular to compensate for movability and/or pressure changes, wherein in particular the bellows seal may be designed to provide a stroke, in particular during expansion and/or compression, in the range of approximately 36 mm to approximately 40 mm, in particular in the range of approximately 37.5 mm to approximately 38.5 mm, such as approximately 38 mm. Strokes in the range of 25-75 mm are also conceivable. The bellows seal can have a length in the range of approximately 280 mm to approximately 330 mm, in particular in the range of approximately 300 mm to approximately 310 mm, such as 305 mm, wherein in particular the bellows seal may be produced from and/or comprises metal.

The bellows seal can have a substantially elongated shape, for example with two ends. One end of the bellows seal can be connected, in particular directly, to the control rod, in particular materially connected, such as welded thereto, in particular sealingly. The end at which the bellows seal may be directly connected to the control rod can be located at the control element sided end section of the control rod. At the end at which the bellows seal may be directly connected to the control rod, the bellows seal can be connected to the control rod in a scaling manner, in particular in the circumferential direction of the control rod, continuously and/or circumferentially sealing. This enables improved sealing. Another end of the bellows seal can be connected, in particular directly, to the connecting flange, in particular materially connected, such as welded thereto, in particular sealingly. This connection can also be continuous and/or circumferentially sealing, e.g. in the circumferential direction of the connecting flange. For example, the bellows seal can be attached or attachable to a face side, in particular a face end side of the connecting flange, such as in the axial direction of the same.

The control valve according to the disclosure can comprise at least one connecting flange securing element and/or at least one control rod securing element. The connecting flange securing element and the at least one control rod securing element can be of the same design or different. For example, two dowel pins can be used. Alternatively, for example, two different dowel pins can be used, e.g. of different thicknesses or with different outer diameters, or one dowel pin and an alternative securing structure.

The connecting flange securing element can engage in the, in particular outer-side, recess of the connecting flange, in particular to prevent rotation, e.g. latching or snapping into it or arresting and/or locking it. The connecting flange securing element can

- be formed separately and/or individually with respect to the coupling structure, in particular the lantern, or the housing cover, e.g. as an independent element, e.g. also made of a different material, or
- be formed in one piece with the coupling structure, in particular the lantern, or the housing cover.

The control rod securing element can engage in the at least one first opening, in particular the first through hole, and the at least one recess, in particular the groove, in particular extending longitudinally in the axial direction of the control rod, in particular in a rotation-preventing manner, e.g. latching or snapping into it or interlocking and/or locking it. The control rod securing element can

- be formed separately and/or individually with respect to the connecting flange, e.g. as an independent element, e.g. also made of a different material, or
- be formed in one piece with the connecting flange.

In an exemplary embodiment of the coupling structure, the coupling structure may comprise a base body and a receiving part, wherein the receiving part has the connecting flange receptacle, wherein the base body and the receiving part are formed in such a way that the receiving part may be at least substantially anti-rotatably arrangeable in a receiving recess delimited by the base body. This allows the connecting flange to be mounted to the coupling structure in an advantageously simple and quick manner. In particular, an alignment of the connecting flange relative to the base body can be advantageously preset via the receiving part with the connecting flange receptacle during assembly. Due to the two-part embodiment of the coupling structure, a seal for the feed-through of the connecting flange can advantageously be arranged above the feed-through between the base body and the receiving part. This enables advantageously simple and quick assembly and maintenance or replacement of the seal. In an exemplary embodiment, the receiving part can have an outer contour which may be formed from-complementary an inner wall of the base body delimiting the receiving recess, wherein the outer contour of the receiving part has a shape which deviates from a substantially circular shape, in particular for receiving and/or rotation-preventing fixing of the receiving part in the receiving recess delimited by the base body. This enables an advantageously simple realization of an anti-rotation means of the receiving part on the base body. The shape of the outer contour of the receiving part can be substantially rectangular, oval, elliptical, trapezoidal, star-shaped, polygonal, irregular and/or asymmetrical, such as when viewed along a center axis of a control rod and/or connecting flange provided for the control rod or the connecting flange receiving opening. The receiving part may delimit an opening for the control rod to pass through, such as completely around a center axis of the opening. It is conceivable that the opening delimited by the receptacle is provided for partially receiving the connecting flange. The receiving part may be formed substantially in the shape of a disk. In particular, the receiving part extends completely around a provided position of the control rod and/or the feedthrough or the connecting flange receiving opening, in particular when viewed along the center axis of the feedthrough or the connecting flange provided for the control rod and/or the connecting flange. The base body of the coupling structure may delimit the receiving recess at the section of the coupling structure on the housing cover side.

The receiving recess may be formed in several steps, wherein the inner wall of the base body delimiting the receiving recess, which in particular may be formed form-complementary to the outer contour of the receiving part, delimits a first portion of the receiving recess and has a different cross-sectional area, in particular extending perpendicular to the center axis, as a further inner wall of the base body delimiting a second portion of the receiving recess. In particular, the inner wall and the further inner wall of the base body are formed parallel to the center axis and displaced relative to one another. In an exemplary embodiment, the inner wall and the further inner wall of the base body are formed in such a way that a cross-sectional area of the receiving recess, in particular extending perpendicular to the center axis, increases in a direction facing away from the section of the coupling structure on the housing cover side. In an exemplary embodiment, the first portion of the receiving recess has a larger cross-sectional area, in particular extending perpendicular to the center axis, than the second portion. In an exemplary embodiment, the further inner wall, which in particular delimits the second portion of the receiving recess, may be round, in particular substantially circular, when viewed along the center axis. In an exemplary embodiment, the receiving part has at least one edge that may be inwardly displaced relative to the outer contour, wherein a part of the receiving part projecting beyond the edge may be provided for arrangement in the second portion of the receiving recess. In particular, the inner wall and/or the further inner wall of the base body may be in particular each formed obliquely, and/or substantially parallel, to the center axis. In an exemplary embodiment, the further inner wall of the base body delimiting the second portion of the receiving recess and/or the part of the receiving part projecting beyond the edge may be provided for clamping or pressing a sealing means between the base body and the receiving part.

In an exemplary embodiment, the coupling structure may comprise at least one sealing means. In particular, the coupling structure may comprise a feedthrough or connecting flange receiving opening provided for the control rod and/or the connecting flange, which may be delimited by the base body. The at least one sealing means may be provided for sealing the feedthrough or the connecting flange receiving opening against a medium to be guided through the valve. The sealing means between the receiving part and the base body advantageously eliminates the need for a seal on the lower side of the feedthrough, which is difficult to access and cumbersome to install. The at least one sealing means may be arranged, in particular completely around the center axis of the feedthrough or the connecting flange receiving opening within the receiving recess, wherein the base body and the receiving part are formed in such a way that the sealing means, when the receiving part is arranged in the receiving recess, may be pressed between the base body and the receiving part, wherein in particular a gap formed between the receiving part and the base body may be sealed against the medium via the at least one sealing means. In an exemplary embodiment, the at least one sealing means may be formed as a sealing ring. In an exemplary embodiment, the base body and the receiving part are formed in such a way that the sealing means on the further inner wall of the base body and in particular within the second portion of the receiving recess, which may be spaced apart from the outer contour of the receiving part and/or from the first portion of the receiving recess, may be clamped or pressed between the base body and the receiving part.

The connecting flange receptacle may be arranged/formed on an inner side of the receiving part delimiting the opening. The receiving part may be formed in such a way that the connecting flange may be arranged on the receiving part via the connecting flange receptacle in such a way that rotation may be prevented. In an exemplary embodiment, the receiving part may be formed in such a way that the connecting flange may be arranged on the base body of the coupling structure via the connecting flange receptacle and the outer contour so that rotation is prevented. It is conceivable that the receiving part and/or the base body may be provided to interact with the control rod securing element and/or the connecting flange securing element.

In an exemplary embodiment, the control valve may comprise a fastening means which may be attachable to the connecting flange, wherein the fastening means, the connecting flange and the receiving part are formed in such a way that the receiving part may be held, in particular clamped, in the receiving recess via the fastening means and/or the connecting flange when the fastening means may be fastened to the connecting flange. By the fastening means, the receiving part can be attached to the base body of the coupling structure together with the connecting flange. As a result, an advantageously low number of different components of the valve and thus also advantageously low manufacturing costs can be achieved. Advantageously fast assembly of the connecting flange and the coupling structure can be made possible, in particular since both the receiving part and the connecting flange are attachable together via a fastening means. It is conceivable that the fastening means and the connecting flange form a screw connection. In particular, the fastening means may be substantially sleeve-shaped. In an exemplary embodiment, the fastening means has a thread, in particular an internal thread. For example, the fastening means may be formed as a type of screw nut. Alternatively, a bayonet connection or the like is also conceivable. In an exemplary embodiment, the connecting flange extends at least partially through the receiving part. In an exemplary embodiment, the connecting flange may comprise a connection area for fastening the fastening means. In particular, the connecting flange has a thread, in particular an external thread, within the connecting area. In particular, the connecting area may be formed on a side of the connecting flange facing away from the bellows, in particular on another side of the receiving part, wherein in particular the receiving part may be arranged on the connecting flange between the connecting area and the bellows. The fastening means and/or the connecting flange form at least one bearing surface, which may be provided for contact with the receiving part. In an exemplary embodiment, the fastening means, the connecting flange and the receiving part are formed in such a way that the receiving part may be held, in particular clamped, in the receiving recess via the fastening means and/or the connecting flange, such as via the at least one bearing surface, when the fastening means may be attached to the connecting flange. In an exemplary embodiment, the at least one bearing surface and/or an outer surface of the receiving part provided for cooperation with the at least one bearing surface may be in particular each aligned at an angle, such as substantially perpendicular, to the center axis. The connecting flange, the fastening means and/or the receiving part may be formed in such a way that the connecting flange, in particular the connecting area of the connecting flange, projects through the opening delimited by the receiving part in an arrangement around the control rod, wherein the fastening means, by fastening the receiving part to the connecting flange, may be clamped between an extension of the connecting flange and/or the base body and the fastening means and/or the connecting flange, wherein in particular the receiving part may be arranged at least partially, in particular largely, within the receiving recess.

FIG. 1 shows a sectional view of a connecting flange 100 according to the disclosure, on the basis of which its basic structure or shape and/or its design can be explained.

As can be seen in FIG. 1, the connecting flange 100 can comprise a, in particular substantially hollow-cylinder-like, connecting body 102 which can have an outer shape that may be designed for engagement and/or attachment with the coupling structure, in particular the lantern, or the housing cover of the control valve. For example, the substantially hollow-cylinder-like connecting body 102 can have a section, in particular a fastening section 104, with, in particular in the longitudinal direction, a substantially constant outer diameter d which may be adapted for fastening to the coupling structure, in particular the lantern, or the housing cover of the control valve. The fastening section 104 can, for example, have a, in particular outer side, threaded section (not shown in FIG. 1; see, for example, FIGS. 2, 3A and 4A with nut 140) for example for screwing to a fastening means, such as a union nut (see, for example, FIGS. 2, 3A and 4A). The fastening section 104 may be adjoined by a further section, in particular an engagement section 106, which may have a larger outer diameter than the outer diameter d of the fastening section 104. The fastening section 104 and the engagement section 106 may be formed in one piece, in particular by the substantially hollow-cylinder-like connecting body 102, for example from the same material. The engagement section 106 may have an outer contour that may be formed in steps, for example the engagement section may have one or more steps 108, 110 that have one or more, in particular different, diameters, in particular outer diameters, d1/d2.

The connecting flange 100, in particular the engagement section 106, can have, as can be seen in FIG. 1, in particular on the outside, at least one first shoulder 108, in particular a first radial shoulder 108. The radial shoulder 108 can be designed and/or adapted for, in particular form-fit and/or form-complementary, engagement with the coupling structure, in particular the lantern, or the housing cover of the control valve (see e.g. FIGS. 2, 3A and 4A), for example via a correspondingly shaped section of the coupling structure or the housing cover, e.g. the connecting flange receiving opening (see FIGS. 2, 3A and 4A). The first shoulder 108 may be a circumferential shoulder that extends substantially around the entire circumference of the connecting flange 100. The diameter, in particular the outer diameter, d1 of the first shoulder 108 may be larger than the diameter, in particular the outer diameter d, of the substantially hollow-cylinder-like connecting body 102, in particular the fastening section 104, wherein d1>d may apply.

Figure 2:
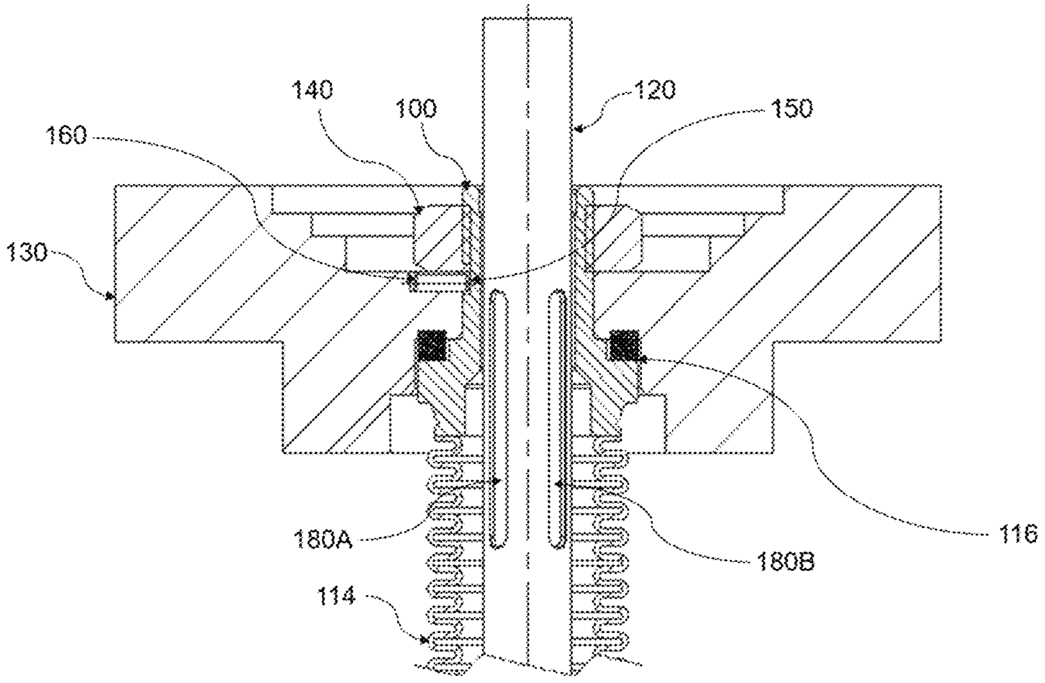
FIG. 2 shows a sectional view of a connecting flange according to the disclosure with an exemplary outer-side anti-rotation means.
Figure 3A:
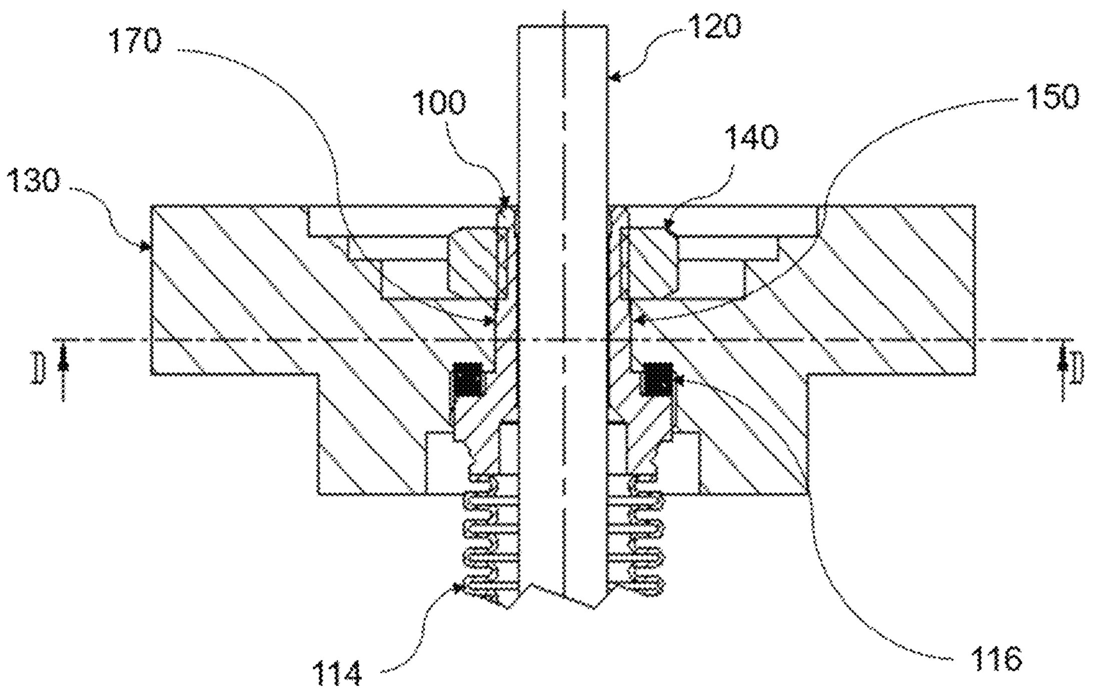
FIG. 3A shows a sectional view of a connecting flange according to the disclosure with an exemplary outer-side anti-rotation means.
Figure 4A:
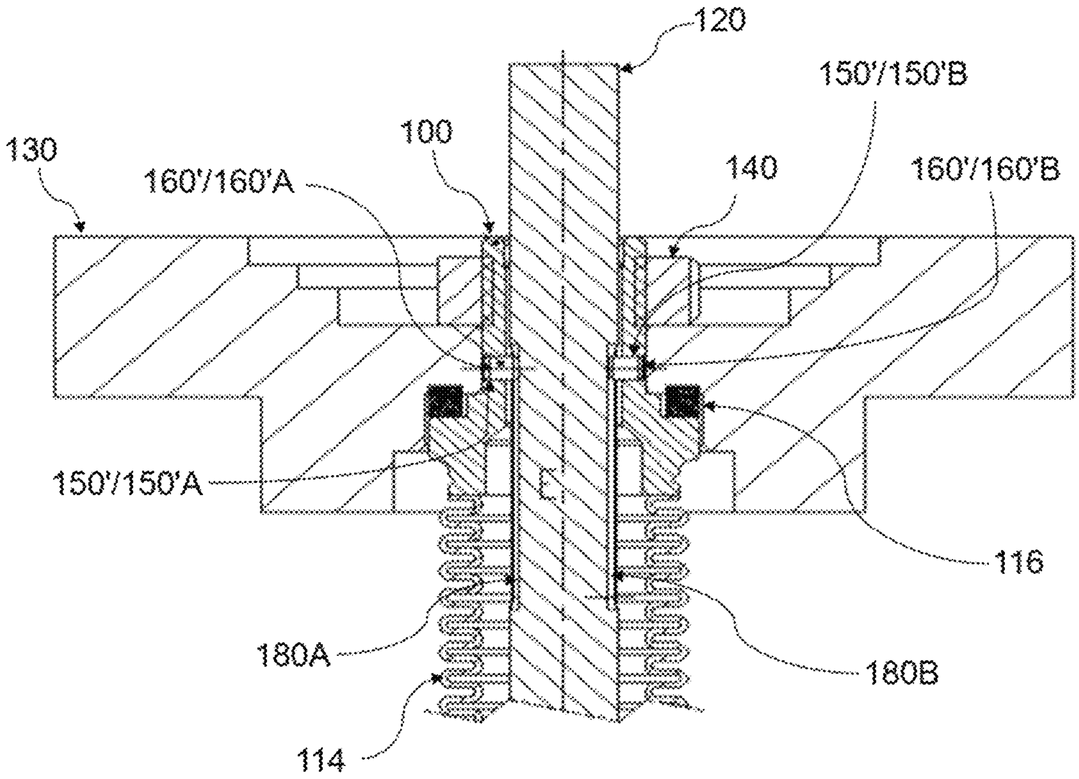
FIG. 4A shows a sectional view of a connecting flange according to the disclosure with an exemplary inner-side anti-rotation means.

The connecting flange 100, in particular the engagement section 106, can have, in particular on the outer side, at least one second shoulder 110, in particular a second radial shoulder 110, for the reception of at least one sealing means, for example a first sealing means 116, which may be formed as a ring seal by way of example (see, for example, FIGS. 2, 3A and 4A). The radial shoulder may be a circumferential shoulder that extends substantially around the entire circumference of the connecting flange 100. The first shoulder 108 may connect to the second shoulder 110, in particular in a stepped manner. The diameter, in particular the outer diameter, d2 of the second shoulder 110 may be larger than the diameter, in particular the outer diameter d, of the substantially hollow-cylinder-like connecting body 102, in particular of the fastening section 104, wherein d2>d may apply, and/or may be larger than the outer diameter d1 of the first shoulder 108, wherein d2>d1 may apply and in particular d2>d1>d. A different choice of these outer diameters d, d1, d2 is also conceivable.

The connecting flange 100 can have, in particular in its longitudinal direction and/or in the direction of the stroke axis H (e.g. axial direction), a face side, or face end side 112, which may be arranged and/or adapted for the arrangement and/or attachment of, for example, a further, in particular second, scaling means. The further sealing means may, for example, be a bellows seal 114 (see, for example, FIGS. 2, 3A and 4A).

FIG. 2 shows a sectional view of a connecting flange 100 according to the disclosure according to an embodiment example, which may be inserted, arranged and/or attached between a control rod 120 according to the disclosure and a housing cover 130 according to the disclosure or a coupling structure 130 according to the disclosure, in particular a lantern 130 according to the disclosure, in particular for connecting these components. In FIGS. 2, 3A and 4A, an exemplary housing cover 130 and/or an exemplary coupling structure 130, in particular an exemplary lantern 130, is shown as one and the same element, namely 130, in order to illustrate the mode of operation of the connecting flange 100 therein, wherein it should be clear that other embodiments of the housing cover and/or the coupling structure are also possible. For example, the housing cover 130 and/or the coupling structure 130 or the lantern 130, does not necessarily have to have the stepped manner of opening for the fastening means 140, in particular the union nut 140. It should also be understood that the housing cover 130 and/or the coupling structure 130 and/or the lantern 130 may extend or expand further in the axial direction than shown. This is therefore only intended to illustrate an inserted state of the connecting flange.

As can be seen in FIG. 2, the connecting flange 100 has an, in particular outer-side, anti-rotation means 150. As shown in FIG. 2, the at least one, in particular outer-side, anti-rotation means 150 can be formed as at least one recess or cutout 150, in particular as at least one notch 150. The recess 150 can be located on an outer side, in particular on a circumference or a circumferential side, of the substantially hollow-cylinder-like connecting body 102 (and/or a fastening section 104) (see e.g. FIG. 1). The recess 150 can be formed for, in particular rotation preventing, engagement (e.g. form-fit and/or form-complementary, e.g. latching, snapping, locking and/or interlocking) with a connecting flange securing element 160, which in FIG. 2 may be formed as a pin 160, in particular as a dowel pin. The connecting flange securing element 160 can secure the connecting flange 100 in the radial and/or circumferential direction, in particular during its assembly, for example when mounting it with the fastening means 140, e.g. when screwing in the union nut, for example in order to reduce unwanted twisting and/or torsion. This can thus protect against one or more sealing means, for example the first and/or second sealing means 114/116, being deformed at least in certain areas or substantially completely and/or even being separated.

As can be seen in FIG. 2, the recess 150 can be formed as a, in particular substantially circular, blind hole. However, the recess 150 can be formed differently, for example as a notch, in particular an elongated notch, which extends in the axial direction of the connecting flange 100. A configuration of the recess as a, in particular elongated, notch may have the advantage that the recess may be adapted for several, in particular axial, positions or heights of the connecting flange securing element 160, which increases flexibility and/or modularity. As can further be seen in FIG. 2, a depth or height of the recess 150 can be smaller than a thickness, in particular a wall thickness, of the substantially hollow-cylinder-like connecting body 102. Alternatively, it would also be conceivable that the recess substantially completely penetrates the substantially hollow-cylinder-like connecting body 102, for example in a radial direction or substantially transversely to the control rod or stroke axis. Furthermore, it can be seen in FIG. 2 that a space for the connecting flange securing element 160 can be provided in the housing cover 130 or the coupling structure 130, for example for deploying or inserting the same.

If the fastening means 140 may be attached to the fastening section 104 of the connecting flange 100, in particular screwed on, axial clamping of the connecting flange 100 to the housing cover 130 (or the coupling structure 130) takes place, wherein the connecting flange securing element 160 can engage in the recess 150 in such a way (e.g. form-fitting and/or form-complementary, e.g. latching, snapping in) in order to arrest and/or lock the connecting flange 100, in particular in its circumferential direction, in particular to reduce twisting and/or torsion, such as during assembly.

FIG. 2 thus shows in particular an outer-side anti-rotation means, which can, for example, provide securing, fixing and/or stabilization in the direction of an outer side of the connecting flange 100, for example in the direction of the coupling structure 130, in particular the lantern 130 and/or the housing cover 130. FIG. 2 further shows an optional sealing means 116, in particular in the form of a ring seal, for example made of graphite, wherein this sealing means 116 can also be produced from a metal, for example for metallic sealing or sealing.

Figure 3B:
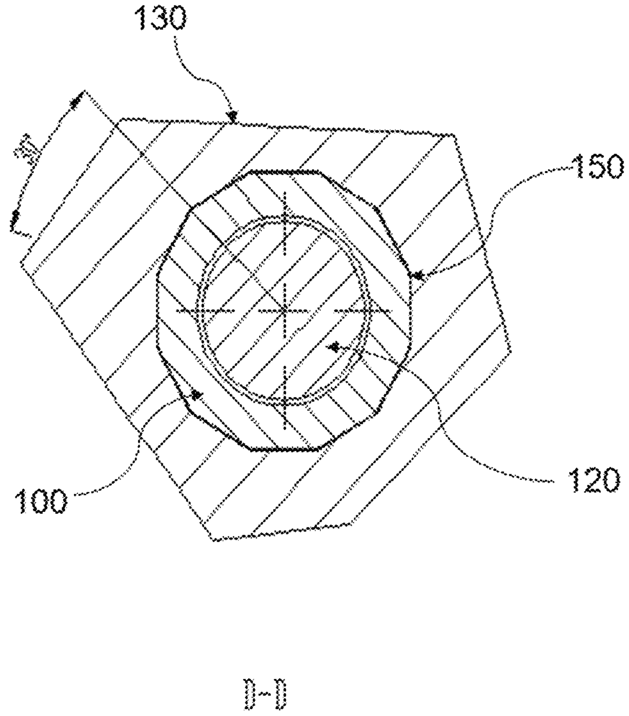
FIG. 3B shows a top view of the connecting flange according to the disclosure from FIG. 3A according to section D-D.

FIGS. 3A and 3B show a connecting flange 100 according to the disclosure according to an embodiment, namely as a sectional view and in top view, e.g. in FIG. 3B according to section D-D from FIG. 3A.

As can be seen in FIG. 3A, the substantially hollow-cylinder-like connecting body 102 (see FIG. 1) or the connecting flange 100 can have at least one, in particular outer-side, anti-rotation means 150. As shown in FIG. 3B, the at least one, in particular outer-side, anti-rotation means 150 can be formed by an outer shape of the substantially hollow-cylinder-like connecting body 102 (see FIG. 1). As can be seen in FIG. 3B, the outer shape of, for example, the hollow-cylinder-like connecting body 102 may have a cross-section that deviates from a substantially circular cross-section. Such a configuration allows the connecting flange 100 and/or the substantially hollow-cylinder-like connecting body 102 to counteract a force, for example in the circumferential direction when fastening e.g. screwing in the fastening means 140, in particular during assembly thereof. This reduces, for example, unwanted, twisting and/or torsion and a tensioning of the connecting flange can occur predominantly or substantially exclusively in the axial direction, or in the stroke direction. This can protect for example one or more sealing means, for example the first sealing means 116 and/or the second sealing means, i.e. the exemplary bellows seal 114. This can, for example, protect one or more sealing means, for example the first and/or second sealing means 114/116, from being deformed at least in certain areas or substantially completely and/or even separated.

As shown in FIG. 3B, the outer shape of the substantially hollow-cylinder-like connecting body 102 and/or the at least one anti-rotation means 150 may have a plurality of corners and/or a plurality of corner points, or may be formed as a polygon. In the specific example of FIG. 3B, the polygon may comprise a total of 12 corners or corner points, which are arranged approximately every 30° in the circumferential direction and are substantially identical in design, in particular with respect to an orientation, size, structure and/or shape. However, the corners can also be designed differently, e.g. in terms of their number, shape, angle and/or size.

The corners can, for example as in FIG. 3B, be arranged evenly distributed along the circumferential direction of the substantially hollow-cylinder-like connecting body and/or the at least one anti-rotation means, for example at equal distances or equal angular intervals (e.g. every) 30°, or also unevenly or irregularly, for example at different and/or varying distances, angular intervals and/or asymmetrically, for example rotationally asymmetrically.

In FIG. 3B, an outer shape of the housing cover 130 or the coupling structure 130 is also recognizable. However, this is only exemplary and can therefore also be designed or formed differently. The 12 corners of FIG. 3B can engage with a connecting flange receiving opening 170, which is, for example, correspondingly shaped and/or formed, whereby an anti-rotation means can be provided to reduce twisting or torsion, in particular during assembly.

Specifically, for example, the outer shape of the at least one anti-rotation means 150 can be matched to a shape, in particular an inner shape, of the connecting flange receptacle 170 of the coupling structure 130, in particular the lantern 130, or of the housing cover 130, in particular for form-fit and/or form-complementary engagement therewith, for example for latching, snapping in, locking and/or interlocking.

Figure 4B:
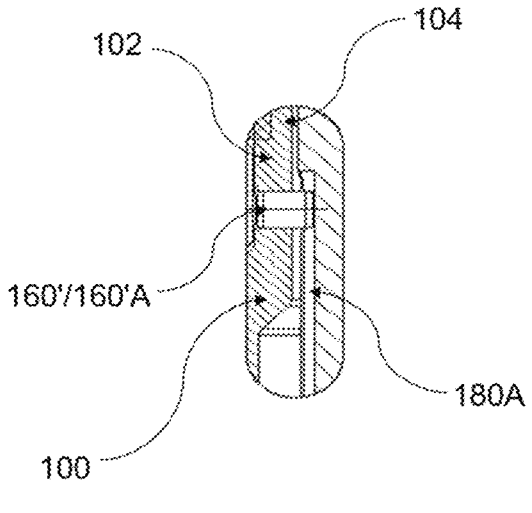
FIG. 4B shows an enlarged section of FIG. 4A.

FIGS. 4A and 4B show a connecting flange 100 according to the disclosure according to an embodiment example, namely as a sectional view and in FIG. 4B as an enlarged section of FIG. 4A.

As can be seen in FIGS. 4A/4B, the substantially hollow-cylinder-like connecting body 102 can have at least one, in particular inner-side, anti-rotation means 150'. The at least one, in particular inner-side, anti-rotation means 150' can be configured to fix the control rod 120 to the connecting flange 100, in particular in a form-fit and/or form-complementary manner, in the radial and/or circumferential direction, in particular to prevent rotation and/or torsion of the control rod 120, in particular during operation of the control valve, and/or to protect the exemplary bellows seal 114. For example, a rotation-preventing engagement (e.g. engaging, snapping, locking and/or latching) can be provided, for example, by a control rod securing element 160' (see details in FIG. 4B), in particular a pin, in particular a dowel pin.

The at least one, in particular inner-side, anti-rotation means 150' can be formed as at least one first opening 150'A, in particular a first through hole 150'A. The at least one first opening 150'A can be adapted or formed for, in particular form-fit and/or form-complementary, arrangement and/or reception of the control rod securing element 160' or a first control rod securing element 160'A, in particular a pin 160'A, in particular a dowel pin 160'A. The at least one first opening 150'A can extend, in particular in the radial direction of the connecting flange 100, through the substantially hollow-cylinder-like connecting body 102, in particular a thickness, in particular a wall thickness, of the substantially hollow-cylinder-like connecting body 102, in particular substantially completely, or can also be formed only partially, for example as a blind hole.

The at least one first opening 150'A can enable the control rod securing element 160'A to reach a recess 180A, in particular a groove, extending longitudinally in the axial direction of the control rod 120, in order to engage therewith, in particular in a form-fit and/or form-complementary manner, so as to latch, snap or lock it in place. The two recesses 180A/180B of the control rod 120 according to the disclosure can also be clearly seen in FIG. 2.

The connecting flange 100 and/or the at least one, in particular inner-side, anti-rotation means 150' can comprise at least one second opening 150'B, in particular a second through-hole 150'B. The second opening 150'B can in principle be substantially identical to the first opening 150'A or have a different design, e.g. a different opening diameter. The second opening 150'B can be adapted or formed for the arrangement and/or reception of a second control rod securing element 160'B, in particular a pin 160'B, in particular a dowel pin 160'B, in a form-fit and/or form-complementary manner. More than two openings are also conceivable, which can, for example, be arranged uniformly, e.g. at equal distances or angular segments, or unevenly, e.g. at different distances, in the circumferential direction of the connecting flange 100 or the substantially hollow-cylindrical connecting body 102. A second anti-rotation means 150'B in the form of a second opening 150'B for a second control rod securing element 160'B can provide an additional fixation or an additional anti-rotation means and reduce twisting and/or torsion even further. As can be seen in FIG. 4A, the at least one first opening 150'A and/or the at least one second opening 150'B may be arranged at about a center of the connecting flange 100 (e.g., substantially centered), in particular as viewed in an axial direction, wherein, in particular, the at least one first opening 150'A and the at least one second opening 150'B may be substantially opposite each other as shown. This may provide for a more even distribution of (axial/radial) forces, for example during assembly and/or during operation.

Figure 5A:
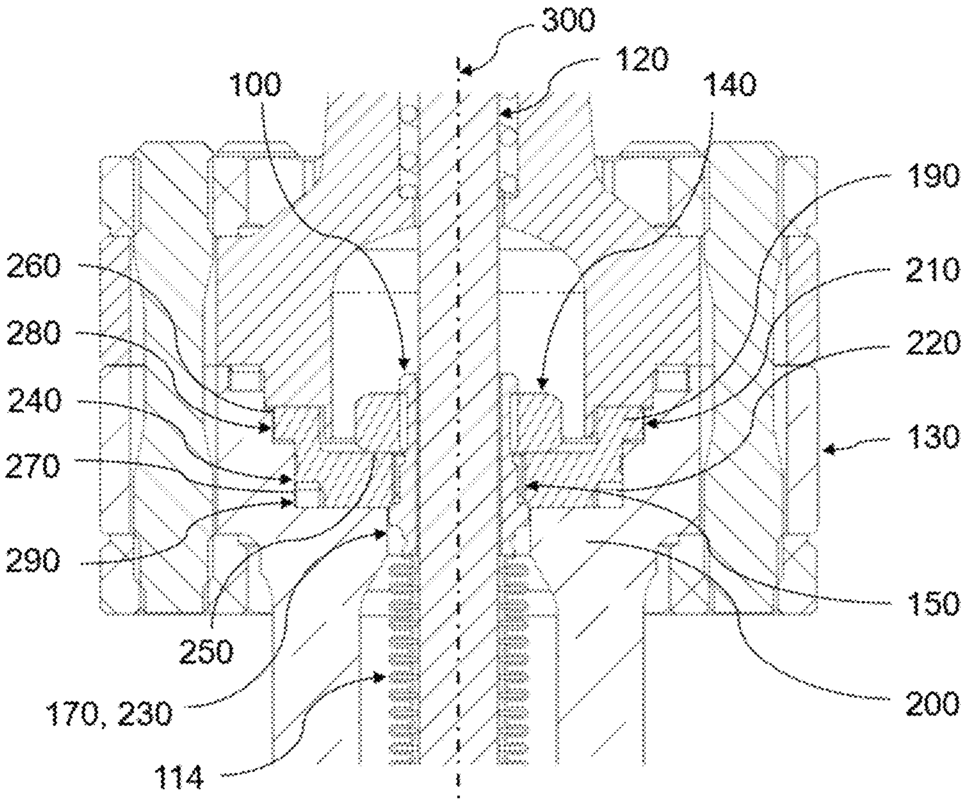
FIG. 5A shows a sectional view of a connecting flange according to the disclosure with exemplary inner-side anti-rotation means on a receiving part of an exemplary coupling structure.
Figure 5B:
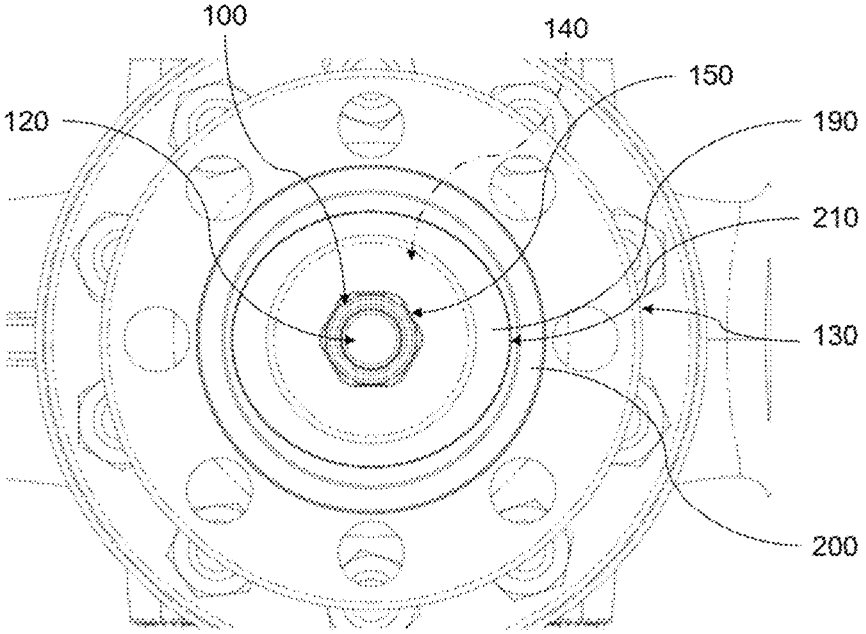
FIG. 5B shows a top view of the connecting flange according to the disclosure shown in FIG. 5A on the receiving part of the coupling structure according to the disclosure.

FIGS. 5A and 5B show a connecting flange 100 according to the disclosure and a coupling structure 130 according to the disclosure according to an embodiment example, namely as a sectional view in FIG. 5A and as a top view in FIG. 5B.

The coupling structure 130, shown in particular in FIGS. 5A and 5B, may comprise a base body 200 and a receiving part 190. The receiving part 190 has the connecting flange receptacle. The receiving part 190 delimits an opening for guiding the control rod 120 through. The base body 200 and the receiving part 190 are formed in such a way that the receiving part 190 may be at least substantially anti-rotatably arrangeable in a receiving recess 240 delimited by the base body 200. The receiving part 190 has an outer contour 210 that may be formed form-complementary to an inner wall 260 of the base body 200 delimiting the receiving recess 240. The outer contour 210 of the receiving part 190 and/or the inner wall 260 of the base body 200 in particular each have a shape that deviates from a substantially circular shape, in particular for receiving and/or rotation-preventing fixing of the receiving part 190 in the receiving recess 240 delimited by the base body 200. In the embodiment shown here, the shape of the outer contour 210 of the receiving part 190 may be formed elliptically (see FIG. 5B). However, other embodiments of the receiving part 190 are also conceivable (see above). The receiving part 190 may be substantially formed in the shape of a disk. The receiving part 190 extends, in particular when viewed along a center axis 300 of the feedthrough 230 provided for the control rod 120 and/or the connecting flange 100 or the connecting flange receiving opening 170, completely around a provided position of the control rod 120 and/or the feed-through 230 or the connecting flange receiving opening 170. The base body 200 of the coupling structure 130 may delimit the receiving recess 240 at the section of the coupling structure 130 on the housing cover side.

The receiving recess 240 may be formed in several steps, wherein the inner wall 260 of the base body 200 delimiting the receiving recess 240, which may be formed in particular form-complementary to the outer contour 210 of the receiving part 190, delimits a first portion 280 of the receiving recess 240 and has a different cross-sectional area, in particular extending perpendicularly to the center axis 300, as a further inner wall 260 of the base body 200 delimiting a second portion 290 of the receiving recess 240. The inner wall 260 and the further inner wall 270 of the base body 200 are formed parallel to the center axis 300 and displaced relative to each other. The inner wall 260 and the further inner wall 270 of the base body 200 are formed such that a cross-sectional area of the receiving recess 240, in particular extending perpendicular to the center axis 300, increases in a direction facing away from the section of the coupling structure 130 on the housing cover side. The first portion 280 of the receiving recess 240 has a larger cross-sectional area, in particular extending perpendicular to the center axis 300, than the second portion 290. The further inner wall 270, which delimits in particular the second portion 290 of the receiving recess 240, may be formed round, in particular substantially circular, when viewed along the center axis 300. The receiving part 190 has at least one edge that may be inwardly displaced relative to the outer contour 210, wherein a part of the receiving part 190 projecting beyond the edge may be provided for arrangement in the second portion 290 of the receiving recess 240. The inner wall 260 and the further inner wall 270 of the base body 200 are each formed substantially parallel to the center axis 300. The further inner wall 270 of the base body 200 delimiting the second portion 290 of the receiving recess 240 and the part of the receiving part 190 projecting beyond the edge are provided, in particular upon interacting or arrangement of the receiving part 190 in the receiving recess 240, for clamping or pressing a sealing means 220 between the base body 200 and the receiving part 190.

The coupling structure may comprise the sealing means 220, formed here in particular as a sealing ring, and the feedthrough 230 or the connecting flange receiving opening 170 provided for the control rod 120 and/or the connecting flange 100, which may be delimited by the base body 200. The sealing means 220 may be provided for sealing the feedthrough 230 or the connecting flange receiving opening 170 against a medium to be guided through the valve. The sealing means 220 may be arranged completely around the center axis 300 of the feedthrough 230 or the connecting flange receiving opening 170 within the receiving recess 240. The base body 200 and the receiving part 190 are formed in such a way that the sealing means 220, when the receiving part 190 may be arranged in the receiving recess 240, may be pressed between the base body 200 and the receiving part 190, wherein in particular a gap formed between the receiving part 190 and the base body 200 may be sealed against the medium via the sealing means 220. The sealing means 220 may be provided for sealing the feedthrough 230 or the connecting flange receiving opening 170 against a medium to be guided through the valve. The sealing means 220 may be arranged completely around the center axis 300 of the feedthrough 230 or the connecting flange receiving opening 170 within the receiving recess 240, wherein the base body 200 and the receiving part 190 are formed in such a way that the sealing means 220, when the receiving part 190 may be arranged in the receiving recess 240, may be pressed between the base body 200 and the receiving part 190, wherein in particular a gap formed between the receiving part 190 and the base body 200 may be sealed against the medium via the at least one sealing means 220. The base body 200 and the receiving part 190 are formed such that the sealing means 220, on the further inner wall 270 of the base body 200, and in particular within the second portion 290 of the receiving recess 240, which may be spaced apart from the outer contour 210 of the receiving part 190 and/or from the first portion 280 of the receiving recess 240, may be clamped or pressed between the base body 200 and the receiving part 190.

The connecting flange receptacle may be arranged/formed on an inner side of the receiving part 190 delimiting the opening. The receiving part 190 may be formed in such a way that the connecting flange 100 may be arranged on the receiving part 190 in an anti-rotatable manner via the connecting flange receptacle, which may be substantially analogous to the previously shown embodiments (see FIGS. 1 to 4). The receiving part 190 may be formed to arrange the connecting flange 100 on the base body 200 of the coupling structure 130 via the connecting flange receptacle and the outer contour 210 in such a way that rotation is prevented. It is conceivable that the receiving part 190 and/or the base body 200 may be provided to interact with the control rod securing element 160' and/or the connecting flange securing element 160.

The valve may comprise a fastening means 140 which may be attachable to the connecting flange 100. The fastening means 140 may be formed here in particular as a type of screw nut. However, other designs of the fastening means 140 or of the connecting flange 100 that can be connected to the fastening means 140 are also conceivable. The fastening means 140, the connecting flange 100 and the receiving part 190 are formed in such a way that the receiving part 190 may be held, in particular clamped, in the receiving recess 240 via the fastening means 140 and/or the connecting flange 100 when the fastening means 140 may be fastened to the connecting flange 100. The connecting flange 100 has a thread, here in particular an external thread, in a connection area for fastening the fastening means 140. In particular, the fastening means 140 has an internal thread. The connecting flange 100, the fastening means 140 and the receiving part 190 are formed in such a way that the connecting flange 100, in particular the connecting area of the connecting flange 100, projects through the opening delimited by the receiving part 190 in an arrangement around the control rod 120, wherein the fastening means 140, by fastening to the connecting flange 100, clamps the receiving part 190 between an extension of the connecting flange 100 and/or the base body 200 and the fastening means 140 may be arranged at least partially, in particular largely, within the receiving recess 240. Alternatively, it is conceivable that the connecting flange 100, the fastening means 140 and/or the receiving part 190 are formed in such a way that the receiving part 190 may be clamped between an extension or a stop of the connecting flange 100 and the base body 200 when the fastening means 140 may be fastened to the connecting flange 100.

The features disclosed in the preceding description, the figures and the claims may be of importance both individually and in any combination for the realization of the disclosure in the various embodiments.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

100 Connecting flange Reference List
102 Connecting body
104 Fastening section
106 Engagement section
108 Shoulder
110 Shoulder
112 Face side
114 Sealing means
116 Sealing means
120 Control rod
130 Coupling structure or housing cover
140 Fastening means
150/150' Anti-rotation means
150'A/150'B Opening
160 Connecting flange securing element
160' Control rod securing element
160'A/160'B Control rod securing element
170 Connecting flange receiving opening
180A/180B Recess
190 Receiving part
200 Base body
210 Outer contour
220 Sealing means
230 Feed-through
240 Receiving recess
250 Bearing surface
260 Inner wall
270 Further inner wall
280 First portion
290 Second portion
300 Centre axis
d, d1, d2 Diameter
a1, a2 Diameter

The invention claimed is:

1. A control valve for adjusting a process fluid flow of a process plant, the control valve comprising:
- a valve housing with an inlet opening, an outlet opening, and a passage opening arranged between the inlet opening and the outlet opening;
- a housing cover arranged opposite the passage opening with a through-opening for a control rod;
- a connecting flange including a hollow-cylinder-like connecting body configured to connect the control rod of the control valve to a coupling structure attachable to a valve housing of the control valve or a housing cover of the control valve, the hollow-cylinder-like connecting body including at least one anti-rotation means, wherein the at least one anti-rotation means is: configured to fix the connecting flange to the coupling structure or the housing cover in a circumferential direction, and/or formed by an outer shape of the hollow-cylinder-like connecting body, the outer shape having a cross-section that deviates from a circular cross-section; and
- a coupling structure arranged between the housing cover and the valve housing, wherein the connecting flange is arranged and/or attached to a housing cover-side section of the coupling structure within the connecting flange receptacle.

2. The control valve according to claim 1, wherein the at least one anti-rotation means configured to fix the connecting flange to the coupling structure or the housing cover is formed as at least one recess.

3. The control valve according to claim 2, wherein:

the at least one recess is formed as a notch extending in an axial direction of the connecting flange and/or as a blind hole;

a depth of the at least one recess is smaller than a thickness of the hollow-cylinder-like connecting body; and/or the at least one recess is configured to engage with a connecting flange securing element to secure the connecting flange in the circumferential direction.

4. The control valve according to claim 1, wherein:

the outer shape of the hollow-cylinder-like connecting body is matched to a shape of a connecting flange receptacle of the coupling structure or of the housing cover; and/or the outer shape of the hollow-cylinder-like connecting body comprises at least one corner and/or at least one corner point.

5. The control valve according to claim 1, wherein:

the outer shape of the hollow-cylinder-like connecting body has a cross-section that is: rectangular, trapezoidal, star-shaped, polygonal, irregular and/or asymmetrical; and/or the outer shape of the hollow-cylinder-like connecting body has a plurality of corners and/or a plurality of corner points, wherein in particular the at least one anti-rotation means is formed as a polygon.

6. The control valve according to claim 1, wherein the coupling structure comprises:

a through-opening for the control rod; and a connecting flange receptacle having a shape with a cross-section that deviates from a circular cross-section configured to receive and/or fix the connecting flange to prevent rotation.

7. The control valve according to claim 6, wherein:

the coupling structure further comprises a base body and a receiving part, the receiving part comprising: (a) the connecting flange receptacle, the base body and the receiving part being formed in such a way that the receiving part is at least anti-rotatably arrangeable in a receiving recess delimited by the base body, and/or (b) an outer contour formed complementary to an inner wall of the base body delimiting the receiving recess, the outer contour of the receiving part having a shape which deviates from a circular shape; and/or the coupling structure further comprises at least one seal and a feedthrough or a connecting flange receiving opening provided for the control rod and/or the connecting flange and delimited by the base body, the at least one seal being configured to seal the feedthrough or the connecting flange receiving opening against a medium guidable through the valve, wherein the at least one seal is arranged around a center axis of the feedthrough or the connecting flange receiving opening within the receiving recess, and wherein the base body and the receiving part are formed to cause the at least one seal, when the receiving part is arranged in the receiving recess, to be pressed between the base body and the connecting flange receiving opening.

8. The control valve according to claim 1, comprising a fastener configured to be attached to the connecting flange, the coupling structure comprising a base body and a receiving part, wherein the receiving part comprises the connecting flange receptacle, the base body and the receiving part being formed such that the receiving part is anti-rotatably arrangeable in a receiving recess delimited by the base body, wherein the fastener, the connecting flange, and the receiving part are formed such that the receiving part, when the fastener is fastened to the connecting flange, is held in the receiving recess via the fastener and/or the connecting flange.

9. The control valve according to claim 1, wherein the control valve comprises:

at least one first seal configured to seal between the connecting flange and the housing cover or between the connecting flange and the coupling structure; and/or at least one second seal comprising a bellows seal configured to be connected at first position to the control rod and at a second position of the connecting flange.

10. The control valve according to claim 1, further comprising at least one connecting flange securing element and/or at least one control rod securing element, wherein:

the connecting flange securing element is configured to engage in a recess of the connecting flange, the connecting flange securing element being formed: separately and/or individually with respect to the coupling structure or the housing cover, or in one piece with the coupling structure or the housing cover; and/or the control rod securing element is configured to engage with a first opening of the connecting flange and a longitudinally extending recess of the control rod, wherein the control rod securing element is formed: separately and/or individually with respect to the connecting flange, or in one piece with the connecting flange.

11. A connecting flange for a control valve for reducing torsion, the control valve being adapted to adjust a process fluid flow of a process plant, the connecting flange comprising:

a hollow-cylinder-like connecting body configured to connect a control rod of the control valve to a coupling structure attachable to a valve housing of the control valve or a housing cover of the control valve, the hollow-cylinder-like connecting body including at least one anti-rotation means configured to fix the control rod to the connecting flange in a circumferential direction, wherein:

the at least one anti-rotation means is formed as at least one first opening configured such that a control rod securing element is arrangeable therein and/or to receive the control rod securing element;

the at least one first opening extends through the hollow-cylinder-like connecting body; and/or the at least one first opening is configured to enable the control rod securing element to reach a recess extending longitudinally to engage therewith.

12. The connecting flange according to claim 11, further comprising at least one second opening configured such that a second control rod securing element is arrangeable therein and/or to receive the second control rod securing element.

13. The connecting flange according to claim 12, wherein:

the at least one first opening and/or the at least one second opening are arranged in a center of the connecting flange; and/or the at least one first opening and the at least one second opening are opposite each other.

14. A control rod for a control valve for adjusting a process fluid flow of a process plant, the control rod including at least one recess extending longitudinally in an axial direction of the control rod to fix the control rod in a circumferential direction on a connecting flange according to claim 11.

15. The control rod according to claim 14, wherein the control rod further comprises at least one second recess extending longitudinally in the axial direction of the control rod, the at least one recess and the at least one recess lie opposite one another.

16. The control valve according to claim 1, wherein the housing cover comprises:

a through-opening configured for the control rod; and a connecting flange receptacle shape with a cross-section that deviates from a circular cross-section configured to receive and/or fix the connecting flange to prevent rotation.

17. A control valve for adjusting a process fluid flow of a process plant, the control valve comprising:

a valve housing with an inlet opening, an outlet opening, and a passage opening arranged between the inlet opening and the outlet opening;

a housing cover arranged opposite the passage opening with a through-opening for a control rod; and a connecting flange including a hollow-cylinder-like connecting body configured to connect the control rod to a coupling structure attachable to the valve housing or the housing cover, the hollow-cylinder-like connecting body including at least one anti-rotation means configured to fix the control rod to the connecting flange in a circumferential direction, wherein:

the at least one anti-rotation means is formed as at least one first opening configured such that a control rod securing element is arrangeable therein and/or to receive the control rod securing element;

the at least one first opening extends through the hollow-cylinder-like connecting body; and/or the at least one first opening is configured to enable the control rod securing element to reach a recess extending longitudinally to engage therewith.

* * * * *